United States Patent
Ishii et al.

(10) Patent No.: US 8,295,836 B2
(45) Date of Patent: Oct. 23, 2012

(54) MOBILE SWITCHING CENTER, RADIO BASE STATION, AND MOBILE COMMUNICATION METHOD

(75) Inventors: Minami Ishii, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 155 days.

(21) Appl. No.: 12/599,229

(22) PCT Filed: May 8, 2008

(86) PCT No.: PCT/JP2008/058572
§ 371 (c)(1),
(2), (4) Date: Feb. 2, 2010

(87) PCT Pub. No.: WO2008/136531
PCT Pub. Date: Nov. 13, 2008

(65) Prior Publication Data
US 2010/0135250 A1    Jun. 3, 2010

(30) Foreign Application Priority Data

May 8, 2007   (JP) .............................. P2007-123763

(51) Int. Cl.
*H04W 4/00*     (2009.01)
*H04W 36/00*    (2009.01)

(52) U.S. Cl. ..................................... 455/435.1; 455/436

(58) Field of Classification Search ........................ None
See application file for complete search history.

(56) References Cited

U.S. PATENT DOCUMENTS

2003/0219024 A1* 11/2003 Purnadi et al. ................ 370/401
2004/0029614 A1*  2/2004 Back et al. .................... 455/560
2006/0234709 A1* 10/2006 Marinescu et al. ........... 455/436

FOREIGN PATENT DOCUMENTS

| JP | 11-205842 A | 7/1999 |
| JP | 2001-285916 A | 10/2001 |
| JP | 2005-536121 A | 11/2005 |
| WO | 2004/016010 A1 | 2/2004 |

OTHER PUBLICATIONS

3GPP TS 36.300 V8.0.0 (Mar. 2007), "Evolved Universal Terrestrial Radio Access (E-UTRA) and Evolved Universal Terrestrial Radio Access Network (E-UTRAN), Overall description, Stage 2," 82 pages.
3GPP TSG-RAN WG2 meeting #57bis, Nokia, "Radio Link Failure and Context Recovery," R2-071229 (Mar. 26-30, 2007), 3 pages.
3GPP TR 24.801 V0.1.0 (Apr. 2007), "3GPP System Architecture Evolution; CT WG1 Aspects," 13 pages.

(Continued)

*Primary Examiner* — Erika Gary
(74) *Attorney, Agent, or Firm* — Osha Liang LLP

(57) ABSTRACT

A mobile exchange (300) comprising a mobile station information management unit (302) which manages mobile station information including a temporary mobile subscriber identity (TMSI) for identifying the each mobile station uniquely in a first mobile management area and a notification unit which notifies a destination wireless base station (200) to which a mobile station (100) is connected in the first mobile management area of the temporary mobile subscriber identity (TMSI) assigned to the mobile station (100) when the mobile station (100) performing communication in a second mobile management area moves from the second mobile management area to the first mobile management area.

5 Claims, 5 Drawing Sheets

OTHER PUBLICATIONS

International Search Report issued in PCT/JP2008/058572, mailed on Jun. 10, 2008, with translation, 3 pages.

Written Opinion issued in PCT/JP2008/058572, mailed on Jun. 10, 2008, 3 pages.

Chinese Office Action issued in Chinese Application No. 200880015217.2, mailed on Apr. 28, 2012, with translation (14 pages).

Notice of Grounds for Rejection for Japanese Patent Application No. 2009-513033 mailed Jun. 12, 2012, with English translation thereof (4 pages).

3GPP TSG-GERAN Meeting #33, Tdoc GP-070233, "Various updates on PS Handover," Nokia, Siemens Networks, Seoul, South Korea, Feb. 12-16, 2007 (24 pages).

* cited by examiner

# MOBILE SWITCHING CENTER, RADIO BASE STATION, AND MOBILE COMMUNICATION METHOD

TECHNICAL FIELD

The present invention relates to a mobile switching center, a radio base station, and a mobile communication method.

BACKGROUND ART

In a mobile communication system being studied as Evolved universal terrestrial radio access network (E-UTRAN), a mobile station is configured to transmit a connection request to a certain cell, when communicating with the certain cell, and when detecting the same cell as the certain cell for a certain time period after failing to detect a radio link between the mobile station and the certain cell (a radio link failure) (see Non-patent Document 1).

Meanwhile, when a mobile station performs a handover between radio base stations, a handover source radio base station transfers mobile station information including TMSI (temporary mobile subscriber identity) to a handover destination radio base station.

Here, when the radio base station having received the above-mentioned connection request determines that the TMSI included in the above-mentioned connection request exists in mobile station information that the radio base station manages, then the radio base station allows the mobile station to continue communication, by use of the mobile station information that the radio base station manages.

On the other hand, when the radio base station determines that the TMSI included in the above-mentioned connection request does not exist in the mobile station information that the radio base station manages, the radio base station determines that the connection request is a new connection request, and performs a new connection setting process.

Under such control, the mobile station is allowed to continue communication, not only when the certain cell with which the mobile station is communicating is the same as the cell detected by the mobile station, but also when the certain cell with which the mobile station is communicating and the cell detected by the mobile station are encompassed by the same radio base station (see Non-patent Document 2).

Meanwhile, in the conventional mobile communication system, a mobile switching center (MME: Mobility Management Entity) manages location information of each of mobile stations either in Idle or in Active, and allocates TMSIs to the mobile stations, the TMSIs uniquely identifying the respective mobile stations within the mobile switching center (see Non-patent Document 3).

Then, when a mobile station travels beyond a mobility management area (pool area) managed by the mobile switching center, the mobile switching center relocates the mobile station information for the mobile station to the newly visited mobile switching center (MME relocation), and the TMSI uniquely identifying the mobile station within the newly visited mobile switching center is reallocated to the mobile station.

Non-patent Document 1: 3GPP 36.300 V8.0.0 Technical specification group radio access network; Evolved universal terrestrial radio access (E-UTRA) and Evolved universal terrestrial radio access network (E-UTRAN); Overall description; Stage 2, 10.1.6
Non-patent Document 2: 3GPP R2-071229, "Radio link failure and context recovery", Nokia
Non-patent Document 3: 3GPP 24.801 V0.1.0 Technical specification group core network and terminals; 3GPP system architecture evolution; CT WG1 aspects (Release 8), 5.3

DISCLOSURE OF THE INVENTION

However, the above-described mobile communication system has the following problem.

When the mobile station travels beyond the mobility management area of the mobile switching center to which the mobile station is connected at a start of communication, the TMSIs in the newly visited mobile switching center and in the mobile station are updated, as described above.

However, a radio base station cannot recognize the reallocated TMSI, because a signal for mobility management is not terminated. Therefore, the radio base station continues to manage the TMSI allocated by the previously visited mobile switching center, as the mobile station information for the mobile station.

Accordingly, the TMSI for the mobile station retained by the mobile station disagrees with the TMSI retained by the radio base station. For this reason, even if the mobile station transmits the connection request after detecting the "radio link failure", the radio base station does not allow the mobile station to continue communication, because the radio base station does not retain the TMSI for identifying the mobile station. Hence, there are problems of reduction in a service performance and an increase in a process load on the mobile switching center.

Accordingly, the present invention has been made in view of the foregoing problems and an object thereof is to provide a mobile switching center, a radio base station, and a mobile communication method, which enable a mobile station to continue communication without re-calling even when the mobile station transmits a connection request after traveling beyond a mobility management area, and which are thereby capable of improving a service performance.

A first aspect of the present invention is summarized as a mobile switching center configured to perform communication with each mobile station located in a first mobility management area via a radio base station, including: a mobile station information manager unit configured to manage mobile station information including a temporary mobile station identifier which uniquely identifies the each mobile station in the first mobility management area; and a notifying unit configured to notify, to a newly connected radio base station to which a mobile station is connected in the first mobility management area, a temporary mobile station identifier allocated to the mobile station, when the mobile station communicating in a second mobility management area travels from the second mobility management area to the first mobility management area.

In the first aspect, the notifying unit can be configured to receive a completion report from the newly connected radio base station, and to notify, to the newly connected radio base station, the temporary mobile station identifier allocated to the mobile station by a response to the completion report, the completion report reporting any of completion of a handover of the mobile station to the newly connected radio base station and completion of relocation of the mobile station information for the mobile station in the newly connected radio base station.

In the first aspect, the notifying unit can be configured to notify, to the newly connected radio base station, the temporary mobile station identifier allocated to the mobile station after completion of updating a location registration area for the mobile station.

A second aspect of the present invention is summarized as a radio base station that determines whether or not to allow a communicating mobile station to continue communication, upon receipt of a connection request from the mobile station, based on a temporary mobile station identifier which is allocated to the mobile station by a mobile switching center and which uniquely identifies the mobile station in a predetermined mobility management area, the radio base station including: a mobile station information manager unit configured to manage mobile station information including the temporary mobile station identifier allocated to the mobile station; a receiver unit configured to receive, from the mobile switching center, a temporary mobile station identifier newly allocated to the mobile station, the temporary mobile station identifier received; and a replacing unit configured to replace the temporary mobile station identifier, included in the mobile station information managed by the mobile station information manager unit, with the received temporary mobile station identifier.

In the second aspect, the radio base station can include a transmitter unit configured to transmit a completion report to the mobile switching center, the completion report reporting any of completion of a handover of the mobile station to the newly connected radio base station and completion of relocation of the mobile station information for the mobile station in the newly connected radio base station, wherein the receiver unit can be configured to receive the temporary mobile station identifier newly allocated to the mobile station by using a response to the completion report.

In the second aspect, the receiver unit can be configured to receive the temporary mobile station identifier newly allocated to the mobile station after completion of updating a location registration area for the mobile station.

A third aspect of the present invention is summarized as a mobile communication method in which a mobile switching center performs communication with each mobile station located in a first mobility management area via a radio base station, and in which the radio base station determines whether or not to allow a mobile station communicating in the first mobility management area to continue communication, upon receipt of a connection request from the mobile station, based on a temporary mobile station identifier that is allocated to the mobile station by the mobile switching center and that uniquely identifies the mobile station in the first mobility management area, wherein the mobile switching center and the radio base station manage mobile station information including a temporary mobile station identifier which uniquely identifies each mobile station in the first mobility management area, the method including the steps of: notifying, from the mobile switching center to a newly connected radio base station to which a mobile station is connected within the first mobility management area, a temporary mobile station identifier allocated to the mobile station, when the mobile station communicating in a second mobility management area travels from the second mobility management area to the first mobility management area; receiving, at the newly connected radio base station, a temporary mobile station identifier newly allocated to the mobile station, from the mobile switching center; and replacing, at the newly connected radio base station, the temporary mobile station identifier included in the managed mobile station information for the mobile station, with the received temporary mobile station identifier.

As described above, according to the present invention, it is possible to provide a mobile switching center, a radio base station, and a mobile communication method, which allow a mobile station to continue communication without re-calling, thereby improving a service performance even when the mobile station transmits a connection request after traveling beyond a mobility management area.

Figure 1:
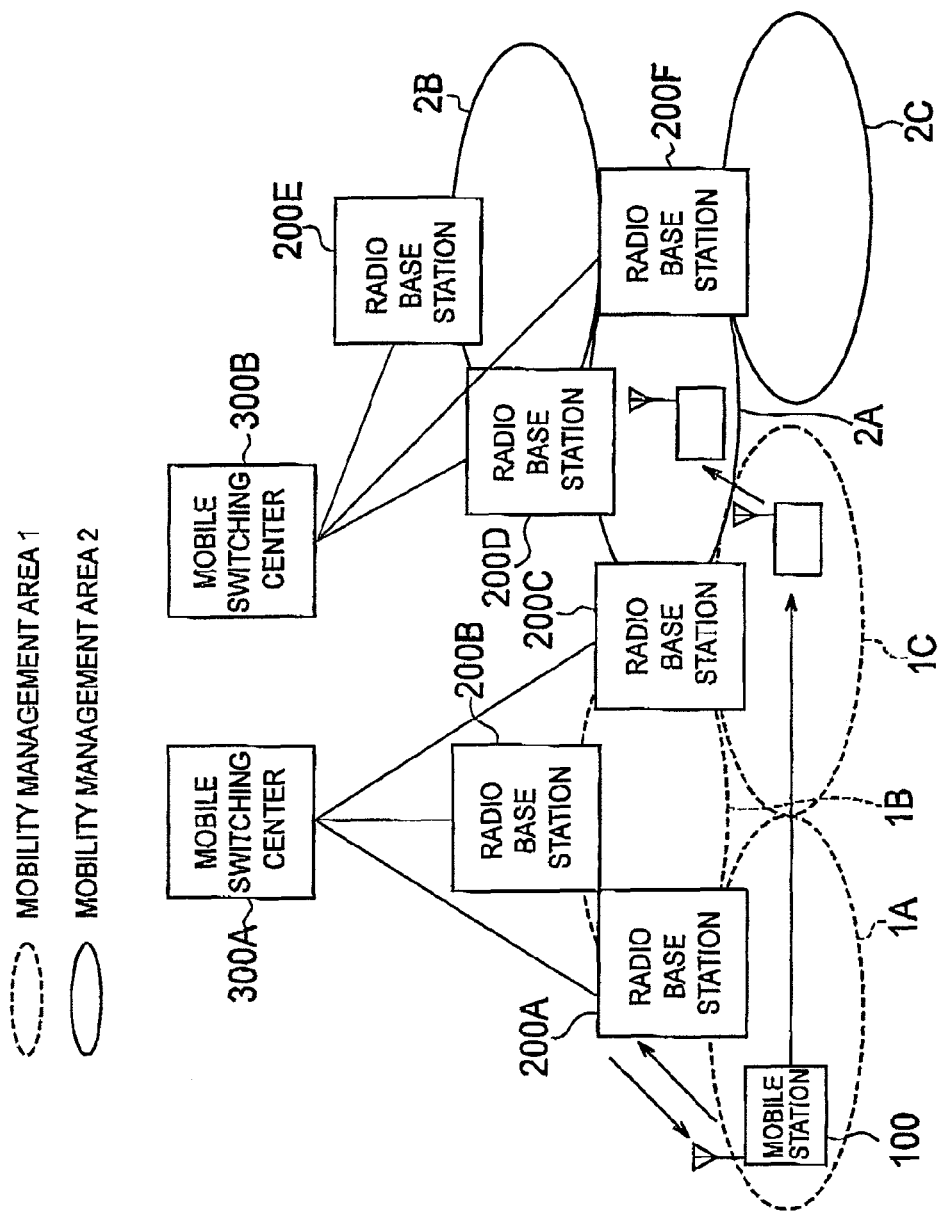
FIG. 1 is an overall configuration diagram of a mobile communication system according to a first embodiment of the present invention.

BEST MODES FOR CARRYING OUT THE INVENTION (Mobile Communication System According to First Embodiment of the Present Invention)

A configuration of a mobile communication system according to a first embodiment of the present invention will be described with reference to FIG. 1 to FIG. 3. Here, throughout the drawings for describing this embodiment, constituents having identical functions will be designated by identical reference numerals and repetitive explanation will be omitted.

As shown in FIG. 1, a mobile communication system according to this embodiment includes a mobile station 100, multiple radio base stations 200A to 200F, and multiple mobility management entities 300A and 300B.

Here, the mobile switching center 300A is configured to manage a mobility management area 1 formed of an area (a cell or a sector) 1A managed by the radio base station 200A, an area (a cell or a sector) 1B managed by the radio base station 200B, and an area (a cell or a sector) 1C managed by the radio base station 200C.

Meanwhile, the mobile switching center 300B is configured to manage a mobility management area 2 formed of an area (a cell or a sector) 2A managed by the radio base station 200D, an area (a cell or a sector) 2B managed by the radio base station 200E, and an area (a cell or a sector) 2C managed by the radio base station 200F.

In the mobile communication system according to this embodiment, the mobility management areas may be formed so as to be overlapped with each other, or formed so as not to be overlapped with each other.

Meanwhile, in this description, an expression "to travel from the mobility management area 1 to the mobility management area 2" means an aspect to travel from the mobility management area 1 to the mobility management area 2 beyond an overlapped area between the mobility management area 1 and the mobility management area 2.

The mobile switching center 300A is configured to perform communication with each mobile station 100 located in the mobility management area 1 (a second mobility management area) via any of the radio base stations 200A to 200C.

In the meantime, the mobile switching center 300B is configured to perform communication with each mobile station 100 located in the mobility management area 2 (a first mobility management area) via any of the radio base stations 200D to 200F.

The configuration of the mobile switching center 300A and the configuration of the mobile switching center 300B are basically the same. Therefore, the configurations of both of the mobility management entities will be described below as that of a mobile switching center 300.

Figure 2:
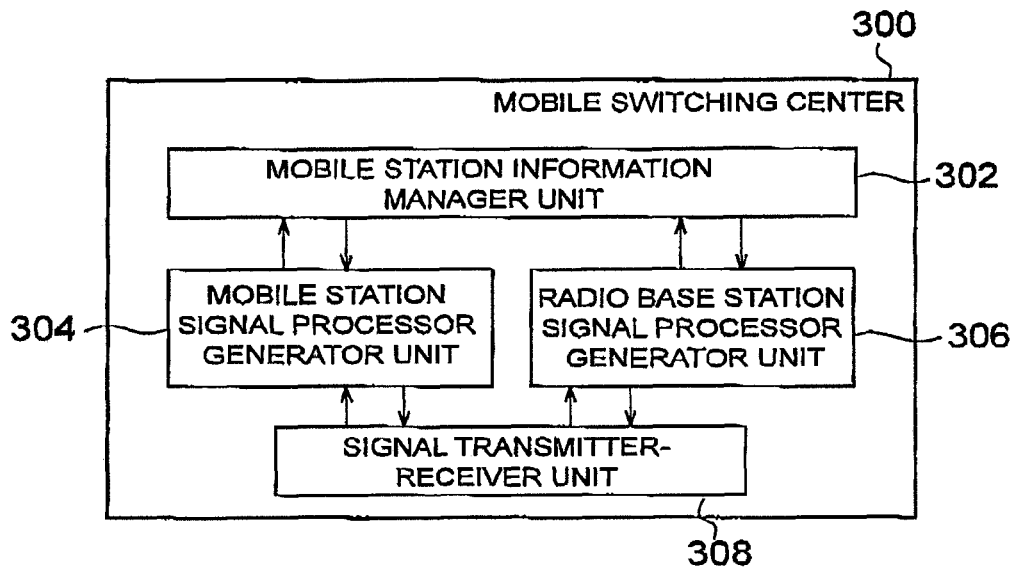
FIG. 2 is a functional block diagram of a mobile switching center according to the first embodiment of the present invention.

As shown in FIG. 2, the mobile switching center 300 includes a mobile station information manager unit 302, a mobile station signal processor generator unit 304 connected to the mobile station information manager unit 302, a radio base station signal processor generator unit 306 connected to the mobile station information manager unit 302, and a signal transmitter-receiver unit 308 connected to the mobile station signal processor generator unit 304 and to the radio base station signal processor generator unit 306.

Here, a part of or all of the functions 302 to 308 of the mobile switching center 300 may be implemented by means of software or implemented by means of hardware.

The mobile station information manager unit 302 is configured to manage mobile station information related to each mobile station 100 located in the mobility management area manage by the mobile switching center 300.

For example, the mobile station information manager unit 302 is configured to manage the mobile station information including TMSI, a located area (a cell or a sector), address information (an IP address), and the like for each mobile station. Here, the TMSI is a temporary mobile station identifier which allows for unique identification of each mobile station in the mobility management area managed by the mobile switching center 300. Note that if the radio base station 200 and the mobile station 100 manage a shared key (Shared Secret, for example) allocated by the mobile switching center 300, and the radio base station 200 is configured to identify (authenticate) the mobile station 100, based on a MAC (Message Authentication Code) calculated by using the shared key and the shared key, or based on any one of the MAC and the shared key, the MAC or the shared key may be used as the temporary mobile station identifier. That is, as long as the radio base station 200 can identify each mobile station based on a result of calculation (such as the MAC) using the shared key, the MAC or the shared key may be used as the temporary mobile station identifier.

The mobile station signal processor generator unit 304 is configured to perform processing of a signal received from the mobile station 100 and processing for generating a signal addressed for the mobile station 100.

For example, the mobile station signal processor generator unit 304 is configured to determine whether or not a tracking area update (TAU) request received from the mobile station 100 is acceptable and to perform processing corresponding to a connection request and the like received from the mobile station 100.

The radio base station signal processor generator unit 306 is configured to perform processing of a signal received from the radio base station 200 and processing for generating a signal addressed for the radio base station 200.

For example, the radio base station signal processor generator unit 306 is configured to perform processing corresponding to a handover completion report received from the radio base station 200 when the communicating mobile station 100 performs a handover, to perform processing for generating a signal to notify a newly connected radio base station 200 of the temporary mobile station identifier (TMSI) which is newly allocated to the mobile station 100 when the communicating mobile station 100 performs a handover beyond the mobility management area, and to perform other processing.

Here, for the case where the mobile station 100 communicating in the second mobility management area managed by another mobile switching center travels from the second mobility management area to the first mobility management area managed by the mobile switching center 300, the signal transmitter-receiver unit 308 is configured to notify, to the newly connected radio base station to which the mobile station 100 is connected within the first mobility management area, the temporary mobile station identifier TMSI allocated to this mobile station 100.

In this connection, the signal transmitter-receiver unit 308 may be configured to notify, to the newly connected radio base station, the temporary mobile station identifier TMSI allocated to the mobile station 100, as follows. Specifically, the signal transmitter-receiver unit 308 firstly receives a completion report (a mobile station information relocation completion report: Relocation complete) from the newly connected radio base station. This completion report indicates a completion of the handover of the mobile station 100 to the newly connected radio base station (Handover complete); or a completion of the relocation of the mobile station information for the mobile station 100 in the newly connected radio base station. Then, the signal transmitter-receiver unit 308 transmits a response to the received completion report (a handover completion report response: Handover complete acknowledge, or a mobile station information relocation completion response: Relocation complete acknowledge). Through the response (as a part of an information element in the response), the signal transmitter-receiver unit 308 notifies the temporary mobile station identifier TMSI.

Meanwhile, the signal transmitter-receiver unit 308 may be configured to inform, to the newly connected radio base station, the temporary mobile station identifier TMSI allocated to the mobile station 100, after tracking area updating concerning the mobile station 100 is completed (Tracking area update complete).

The radio base station 200 according to this embodiment is configured as follows. When receiving a connection request from the communicating mobile station 100, the radio base station 200 determines whether or not to allow the mobile station 100 to continue communication, the determination made based on the temporary mobile station identifier TMSI which uniquely identifying the mobile station 100 in a predetermined mobility management area, and which is allocated to the mobile station 100 by the mobile switching center 300.

Figure 3:
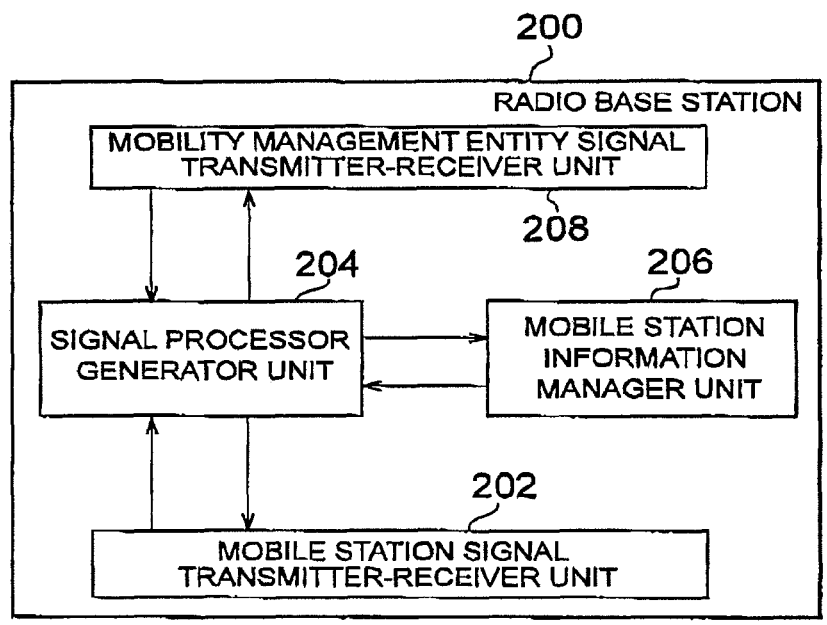
FIG. 3 is a functional block diagram of a radio base station according to the first embodiment of the present invention.

As shown in FIG. 3, the radio base station 200 according to this embodiment includes a mobile station signal transmitter-receiver unit 202, a signal processor generator unit 204 connected to the mobile station signal transmitter-receiver unit 202, a mobile station information manager unit 206 connected to the signal processor generator unit 204, and a mobile switching center signal transmitter-receiver unit 208 connected to the signal processor generator unit 204.

Here, a part of or all of the functions 202 to 208 of the radio base station 200 may be implemented by means of software or implemented by means of hardware.

The mobile station signal transmitter-receiver unit 202 is configured to perform processing of receiving a signal transmitted by the mobile station 100, and to perform processing of transmitting a signal to the mobile station 100.

For example, the mobile station signal transmitter-receiver unit 202 is configured to receive a connection request (or a reconnection request) transmitted by the mobile station 100, or to forward the temporary mobile station identifier TMSI, newly allocated by the mobile switching center 300, to the mobile station 100, when the mobile station 100 travels beyond the mobility management area.

The signal processor generator unit 204 is configured to perform processing corresponding to the signals received from the mobile station 100 and the mobile switching center 300, and processing for generating the signals to be transmitted to the mobile station 100 and the mobile switching center 300.

For example, the signal processor generator unit 204 is configured to receive the temporary mobile station identifier TMSI, that is newly allocated by the mobile switching center 300, from the mobile switching center 300, and to input the temporary mobile station identifier TMSI to the mobile station information manager unit 206, when the mobile station 100 performs the handover beyond the mobility management area.

Meanwhile, the signal processor generator unit 204 is configured to make an inquiry to the mobile station information manager unit 206, upon receipt of a reconnection request from the mobile station 100, and then to determine whether or not the reconnection request is acceptable.

The mobile station information manager unit 206 is configured to manage the mobile station information for the communicating mobile station 100.

For example, the mobile station information manager unit 206 is configured to manage the mobile station information on each mobile station 100 communicating with the radio base station 200, the mobile station information including at least one of the temporary mobile station identifier TMSI allocated by the mobile switching center 300, a mobile station identifier (such as C-RNTI: Cell radio network temporary identifier) allocated by the radio base station 200, setting information on a radio bearer set up between itself and the radio base station, security setting information, and the like.

Here, the mobile station information manager unit 206 is configured to replace the temporary mobile station identifier TMSI included in managing mobile station information with the temporary mobile station identifier TMSI received by the mobile switching center signal transmitter-receiver unit 208.

The mobile switching center signal transmitter-receiver unit 208 is configured to perform reception processing corresponding to a signal transmitted by the mobile switching center 300, and processing of transmitting a signal to the mobile switching center 300.

For example, the mobile switching center signal transmitter-receiver unit 208 is configured to perform processing of receiving a signal transmitted from the mobile switching center 300 to the mobile station 100, and processing of receiving the temporary mobile station identifier TMSI which is newly allocated to the mobile station 100 by the mobile switching center 300, when the mobile station 100 performs the handover beyond the mobility management area.

Moreover, the mobile switching center signal transmitter-receiver unit 208 is configured to transmit a completion report (mobile station information relocation completion report: Relocation complete) to the mobile switching center 300, the completion report reporting that the handover of the mobile station 100 to the radio base station 200 (the newly connected radio base station) is completed (Handover complete) or that relocation of the mobile station information for the mobile station 100 in the radio base station 200 is completed.

Meanwhile, the mobile switching center signal transmitter-receiver unit 208 may be configured to receive the temporary mobile station identifier TMSI newly allocated to the mobile station 100 by using the response to the above-described completion report (the handover completion report response: Handover complete acknowledge, or the mobile station information relocation completion response: Relocation complete acknowledge).

Meanwhile, the mobile switching center signal transmitter-receiver unit 208 may be configured to receive the temporary mobile station identifier TMSI newly allocated to the mobile station 100, after the location registration area updating for the mobile station 100 is completed (Tracking area update complete).

(Operations of Mobile Communication System According to First Embodiment of the Present Invention)

Now, operations of the mobile communication system according to this embodiment will be described below with reference to FIG. 1 as well as FIG. 4 to FIG. 6.

First, an operation of the mobile switching center 300B according to this embodiment will be described with reference to FIG. 1 and FIG. 4.

Figure 4:
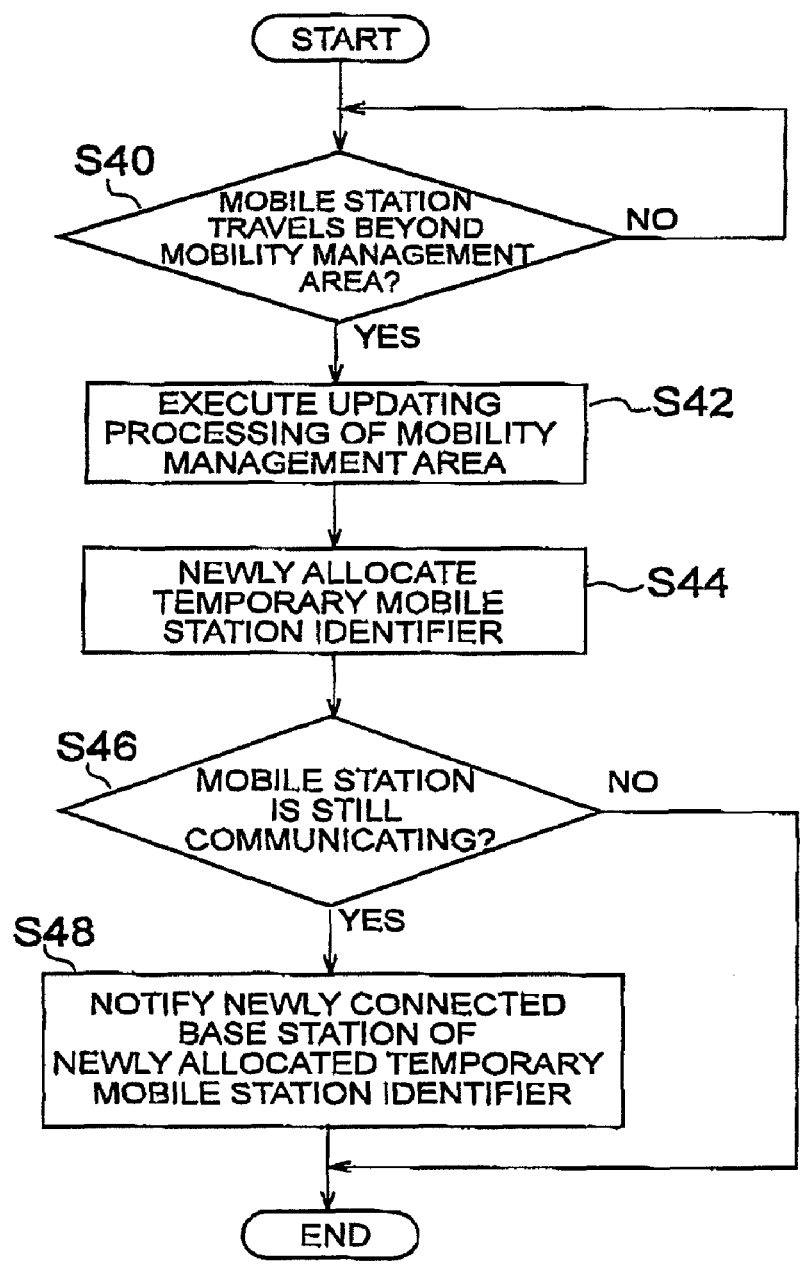
FIG. 4 is a flowchart showing operations of the mobile switching center according to the first embodiment of the present invention.

As shown in FIG. 4, in step S40, the mobile switching center 300B determines whether or not the mobile station 100 travels beyond the mobility management area 1 which is managed by the mobile switching center 300A.

This operation goes to step S42 if YES in step S40. This operation repeats step S40 if NO in step S40.

The mobile switching center 300B performs update processing of the mobility management area for the mobile station 100 (from the mobility management area 1 to the mobility management area 2) in step S42, and allocates the new temporary mobile station identifier TMSI to the mobile station 100 in step S44.

In step S46, the mobile switching center 300B determines whether or not the mobile station 100 is still in Active.

This operation goes to step S48 if YES in step S46. This operation is terminated if NO in step S46.

In step S48, the mobile switching center 300B notifies, to the newly connected radio base station 200D to which the mobile station 100 is connected in the mobility management area 2, the temporary mobile station identifier TMSI (the new TMSI) allocated to the mobile station 100.

Second, an operation of the radio base station 200 according to this embodiment will be described with reference to FIG. 1 and FIG. 5.

Figure 5:
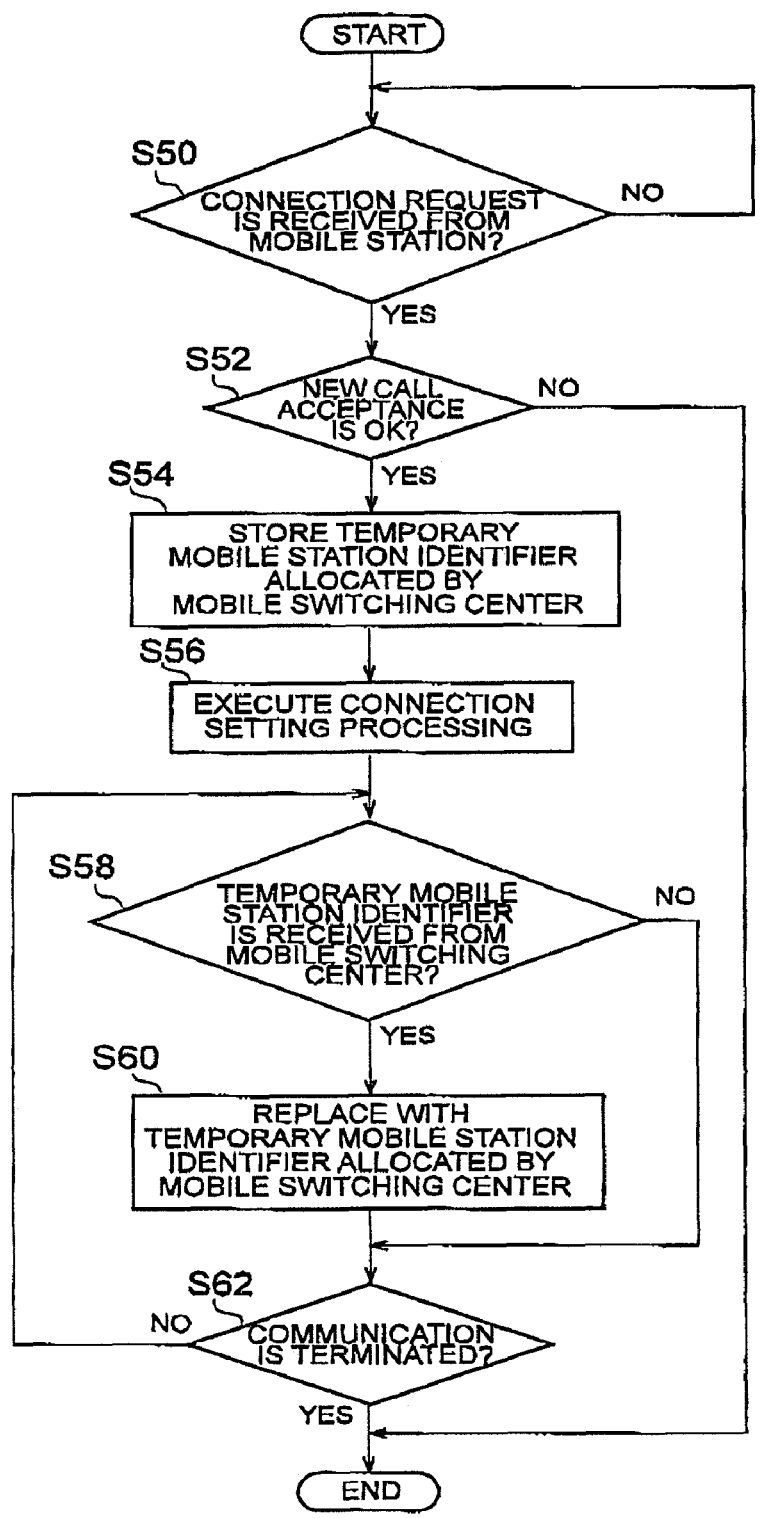
FIG. 5 is a flowchart showing operations of the radio base station according to the first embodiment of the present invention.

As shown in FIG. 5, when the radio base station 200 receives the connection request from the mobile station 100 in step S50, the radio base station 200 performs call acceptance determination concerning the connection request in step S52.

This operation goes to step S54 when acceptance is permitted. This operation is terminated when acceptance is rejected.

The radio base station 200 stores the temporary mobile station identifier TMSI which is contained in the received connection request and allocated by the mobile switching center 300 in Step S54, and performs connection setting processing using the temporary mobile station identifier TMSI in step S56.

When receiving the temporary mobile station identifier TMSI newly allocated to the communicating mobile station 100 by the mobile switching center 300 in step S58, the radio base station 200 replaces the temporary mobile station identifier TMSI for the mobile station 100, which is stored in the mobile station information manager unit 206 of the radio base station 200, with the new temporary mobile station identifier TMSI in steps S60.

Thereafter, the operation from steps S58 to 62 are repeated, until the mobile station 100 terminates communication.

Third, operations of the mobile communication system according to this embodiment will be described with reference to FIG. 1 and FIG. 6. To be more specific, the description is given of the operations when the mobile station 100 performs a handover from the previously connected radio base station 200C to the newly connected radio base station 200D in the mobile communication system according to this embodiment.

Figure 6:
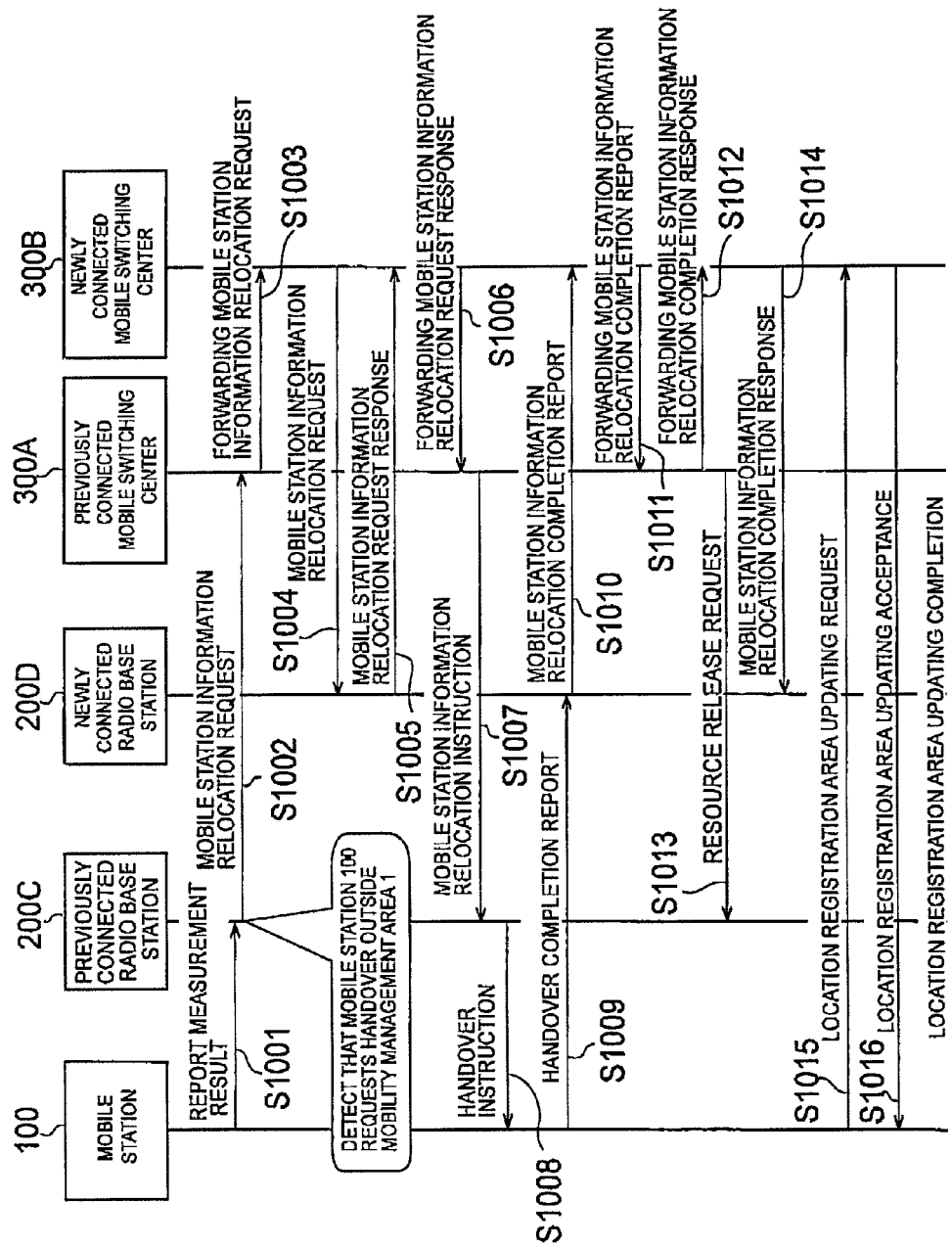
FIG. 6 is a sequence diagram showing operations of the mobile communication system according to the first embodiment of the present invention.

As shown in FIG. 6, in step S1001, when the mobile station 100 located in an area 10 within the mobility management area 1 satisfies a predetermined handover condition, the mobile station 100 transmits a measurement result report (Measurement report), containing an identifier of a handover destination cell (a newly connected cell), to the previously connected radio base station 200C to which the mobile station 100 is currently connected.

In step S1002, upon receipt of the measurement result report (Measurement report) from the mobile station 100, the previously connected radio base station 200C determines that it has received a request for a handover to a cell outside the mobility management area 1 if there is no connection with the above-mentioned newly connected cell, and the previously connected radio base station 200C transmits a mobile station information relocation request (Relocation required), for requesting for relocation of the mobile station information for the mobile station, to the previously connected mobile switching center 300A that manages the previously connected radio base station 200C.

In step S1003, upon receipt or the mobile station information relocation request (Relocation required), the previously connected mobile switching center 300A forwards the mobile station information relocation request (Relocation required) to the newly connected mobile switching center 300B that manages the above-mentioned newly connected cell (Forward relocation request).

In step S1004, upon receipt of the forwarded mobile station information relocation request (Relocation required), the newly connected mobile switching center 300B transmits the mobile station information relocation request (Relocation required), for requesting for relocation of the mobile station information for the mobile station 100, to the newly connected radio base station 200D that manages the above-mentioned newly connected cell.

In step S1005, upon receipt of the mobile station information relocation request (Relocation required), the newly connected radio base station 200D transmits a mobile station information relocation request response (Relocation request acknowledge), which is a response to the mobile station information relocation request (Relocation required), to the newly connected mobile switching center 300B.

In step S1006, upon receipt of the mobile station information relocation request response (Relocation request acknowledge), the newly connected mobile switching center 300B forwards the mobile station information relocation request response (Relocation request acknowledge) to the previously connected mobile switching center 300A (Forward relocation response).

In step S1007, upon receipt of the forwarded mobile station information relocation request response (Relocation request acknowledge), the previously connected mobile switching center 300A transmits a mobile station information relocation instruction (Relocation command), for instructing relocation of the mobile station information for the mobile station, to the previously connected radio base station 200C.

In step S1008, upon receipt of the mobile station information relocation instruction (Relocation command), the previously connected radio base station 200C transmits a handover instruction (Handover command), for instructing the mobile station 100 to perform a handover to the newly connected cell, to the mobile station 100.

In step S1009, upon receipt of the handover instruction (Handover command), the mobile station 100 performs the handover to the newly connected cell as instructed in the handover instruction (Handover command) and transmits a handover completion report (Handover confirm), for reporting completion of the handover, to the newly connected radio base station 200D.

Here, the mobile station 100 may transmit a location registration area updating request (Tracking area update (TAU) request), for requesting for updating the location registration area of the mobile station 100, to the newly connected mobile switching center 300B as well as transmitting the handover completion report (Handover confirm) to the newly connected radio base station 200D.

In step S1010, upon receipt of the handover completion report (Handover confirm), the newly connected radio base station 200D transmits a mobile station information relocation completion report (Relocation complete) to the newly connected mobile switching center 300B, the mobile station information relocation completion report reporting that the handover of the mobile station 100 to the newly connected radio base station 200D (the newly connected cell) is completed or that relocation of the mobile station information for the mobile station 100 in the newly connected radio base station 200D is completed.

Here, when the newly connected radio base station 200D has received the location registration area updating request (Tracking area update (TAU) request) together with the handover completion report (Handover confirm) in step S1009, the newly connected radio base station 200D may forward the location registration area updating request (Tracking area update (TAU) request) to the newly connected mobile switching center 300B as well as transmitting the mobile station information relocation completion report (Relocation complete).

In step S1011, upon receipt of the mobile station information relocation completion report (Relocation complete), the newly connected mobile switching center 300B forwards the mobile station information relocation completion report to the previously connected mobile switching center 300A (Forward relocation complete).

However, when the newly connected radio base station 200D has forwarded the location registration area updating request (Tracking area update (TAU) request) together with the mobile station information relocation completion report (Relocation complete) in step S1010, the newly connected mobile switching center 300B may receive the location registration area updating request (Tracking area update (TAU) request) together with the mobile station information relocation completion report (Relocation complete) and may deliver the temporary mobile station identifier to the mobile station 100 in step S1011.

In step S1012, upon receipt of the forwarded mobile station information relocation completion report (Relocation complete), the previously connected mobile switching center 300A forwards the mobile station information relocation completion response (Relocation complete acknowledge), which is the response to the forwarded mobile station information relocation completion report (Relocation complete), to the newly connected mobile switching center 300B (Forward relocation complete acknowledge).

In step S1013, upon receipt of the forwarded mobile station information relocation completion report (Relocation complete), the previously connected mobile switching center 300A transmits a resource release request (Release resource), for requesting for release of resources shared with the mobile station 100, to the previously connected radio base station 200C.

In step S1014, upon receipt of the forwarded mobile station information relocation completion response (Relocation complete acknowledge), the newly connected mobile switching center 300B transmits the mobile station information relocation completion response (Relocation complete acknowledge) to the newly connected radio base station 200D.

If having received the location registration area updating request (Tracking area update (TAU) request) together with the handover completion report (Handover confirm) from the newly connected radio base station 200D, the newly connected mobile switching center 300B may notify in step S1011 the newly connected radio base station 200D of the temporary mobile station identifier TMSI newly assigned to the mobile station 100 together with the mobile station information relocation completion response (Relocation complete acknowledge).

In step S1015, upon transmission of the handover completion report (Handover confirm), the mobile station 100 transmits the location registration area updating request (Tracking area update (TAU) request) to the newly connected mobile switching center 300B.

In step S1016, upon receipt of the location registration area updating request (Tracking area update (TAU) request), the newly connected mobile switching center 300B transmits a location registration area updating request acceptance (Tracking area update (TAU) accept), which is a response to the location registration area updating request (Tracking area update (TAU) request), to the mobile station 100.

Here, when transmitting the location registration area updating request acceptance (Tracking area update (TAU) accept) to the mobile station 100, the newly connected mobile switching center 300B may notify the newly connected base station 200D of the temporary mobile station identifier TMSI by adding the temporary mobile station identifier TMSI newly assigned to the mobile station 100 (in a piggy-back style, for example).

The newly connected base station 200D is configured to monitor the temporary mobile station identifier TMSI added to the location registration area updating request acceptance (Tracking area update (TAU) accept) in this case.

In step S1017, upon receipt of the location registration area updating request acceptance (Tracking area update (TAU) accept), the mobile station 100 transmits a location registration area updating completion (Tracking area update (TAU) complete) to the newly connected mobile switching center 300B.

In step S1018, upon receipt of the location registration area updating completion (Tracking area update (TAU) complete), the newly connected mobile switching center 300B transmits a mobile station identifier updating request to the newly connected radio base station 200D in order to notify the temporary mobile station identifier TMSI which is newly delivered to the mobile station 100.

(Operation and Effect of Mobile Communication System According to First Embodiment of the Present Invention)

According to the mobile communication system of this embodiment, the mobile station is allowed to continue communication without re-calling even when the mobile station 100 transmits the connection request after traveling beyond the mobility management area 1, thereby improving a service performance.

Moreover, according to the mobile communication system of this embodiment, since the mobile station 100 does not re-call even when the mobile station 100 transmits the connection request after traveling beyond the mobility management area 1, the mobile station 100 is not required to transmit a signal for re-calling to the mobile switching center 300. Therefore, it is possible to perform connection processing between the radio base station 200 and the mobile station 100, thereby capable of reducing a process burden on the mobile switching center 300.

Although the present invention has been described above in detail by using the aforementioned embodiment, it is apparent to those skilled in the art that the present invention is limited to the embodiment explained herein. The present invention may be embodied in modified and altered aspects without departing from the gist and scope of the present invention to be defined by the description of the scope of the appended claims. Therefore, the disclosure herein is intended for exemplary explanation and not for any restrictions to the present invention.

It is to be noted that the entire contents of Japanese Patent Application No. 2007-123763 (filed on May 8, 2007) are incorporated herein by reference.

INDUSTRIAL APPLICABILITY

As described above, according to a mobile switching center, a radio base station, and a mobile communication method of the present invention, a mobile station is allowed to continue communication without re-calling even when the mobile station transmits a connection request after traveling beyond a mobility management area, thereby capable of improving a service performance. Hence the present invention is useful for radio communication such as mobile telecommunication.

The invention claimed is:

1. A mobile switching center configured to perform communication with each mobile station located in a first mobility management area via a radio base station, comprising:
  a mobile station information manager unit configured to manage mobile station information including a temporary mobile station identifier which uniquely identifies each mobile station in the first mobility management area; and
  a notifying unit configured to notify, to a newly connected radio base station to which a mobile station is connected in the first mobility management area, a temporary mobile station identifier allocated to the mobile station at a second mobility management area, when the mobile station communicating in the second mobility management area moves from the second mobility management area to the first mobility management area,
  wherein the notifying unit is configured to receive a completion report from the newly connected radio base station, the completion report reporting any of completion of a handover of the mobile station to the newly connected radio base station and completion of relocation of the mobile station information for the mobile station in the newly connected radio base station, and
  wherein the notifying unit is configured to notify, to the newly connected radio base station, the temporary mobile station identifier allocated to the mobile station after received completion of updating a location registration area for the mobile station from the mobile station.

2. A radio base station that determines whether or not to allow a communicating mobile station to continue communication, upon receipt of a connection request from the mobile station, based on a temporary mobile station identifier which is allocated to the mobile station by a mobile switching center and which uniquely identifies the mobile station in a predetermined mobility management area, the radio base station comprising:
- a mobile station information manager unit configured to manage mobile station information including the temporary mobile station identifier allocated to the mobile station;
- a receiver unit configured to receive, from the mobile switching center, a temporary mobile station identifier newly allocated to the mobile station; and
- a replacing unit configured to replace the temporary mobile station identifier, included in the mobile station information managed by the mobile station information manager unit, with the received temporary mobile station identifier.

3. The radio base station according to claim 2, comprising:
- a transmitter unit configured to transmit a completion report to the mobile switching center, the completion report reporting any of completion of a handover of the mobile station to a newly connected radio base station and completion of relocation of the mobile station information for the mobile station in the newly connected radio base station,
- wherein the receiver unit is configured to receive the temporary mobile station identifier newly allocated to the mobile station by using a response to the completion report.

4. The radio base station according to claim 2, wherein the receiver unit is configured to receive the temporary mobile station identifier newly allocated to the mobile station after completion of updating a location registration area for the mobile station.

5. A mobile communication method in which a mobile switching center performs communication with each mobile station located in a first mobility management area via a radio base station, and in which the radio base station determines whether or not to allow a mobile station communicating in the first mobility management area to continue communication, upon receipt of a connection request from the mobile station, based on a temporary mobile station identifier that is allocated to the mobile station by the mobile switching center and that uniquely identifies the mobile station in the first mobility management area,
- wherein the mobile switching center and the radio base station manage mobile station information including a temporary mobile station identifier which uniquely identifies each mobile station in the first mobility management area,
- the method comprising the steps of:
- notifying, from the mobile switching center to a newly connected radio base station to which a mobile station is connected within the first mobility management area, a temporary mobile station identifier allocated to the mobile station at the second mobility management area, when the mobile station communicating in a second mobility management area travels from the second mobility management area to the first mobility management area;
- receiving, at the newly connected radio base station, a temporary mobile station identifier newly allocated to the mobile station, from the mobile switching center; and
- replacing, at the newly connected radio base station, the temporary mobile station identifier included in the managed mobile station information for the mobile station, with the received temporary mobile station identifier,
- wherein notifying further comprises:
  - receiving a completion report from the newly connected radio base station, the completion report reporting any of completion of a handover of the mobile station to the newly connected radio base station and completion of relocation of the mobile station information for the mobile station in the newly connected radio base station, and
  - notifying to the newly connected radio base station, the temporary mobile station identifier allocated to the mobile station after received completion of updating a location registration area for the mobile station from the mobile station.

* * * * *